ly Examiner—William D. Martin
United States Patent
Gergely

[15] 3,663,271
[45] May 16, 1972

[54] SURFACE-MODIFIED ACID CRYSTALS AND PROCESS FOR THEIR PREPARATION

[72] Inventor: Gerhard Gerfely, Vienna, Austria
[73] Assignee: Organon Inc., West-Orange, N.J.
[22] Filed: Mar. 26, 1970
[21] Appl. No.: 23,005

[30] Foreign Application Priority Data

Mar. 26, 1969 Germany..................P 19 15 509.0

[52] U.S. Cl. ........................117/100 A, 117/118, 260/535 P
[51] Int. Cl.........................................................C07c 55/02
[58] Field of Search...................117/100 BA, 118; 252/391; 260/535 P

[56] References Cited

UNITED STATES PATENTS

| | | | |
|---|---|---|---|
| 3,476,588 | 11/1969 | Pitel | 117/100 |
| 3,518,343 | 6/1930 | Welsh | 117/100 X |
| 3,354,863 | 11/1967 | Reynolds | 117/100 X |
| 1,936,364 | 11/1933 | Pasternack et al. | 260/535 X |
| 3,001,228 | 9/1961 | Nack | 117/100 X |
| 3,206,477 | 9/1965 | Haga | 260/535 |
| 3,420,881 | 1/1969 | Turco et al. | 260/535 |
| 3,131,068 | 4/1964 | Greif et al. | 260/535 X |

FOREIGN PATENTS OR APPLICATIONS 449,675    7/1948    Canada..................................260/535

*Primary Examiner*—William D. Martin
*Assistant Examiner*—Mathew R. P. Perrone, Jr.
*Attorney*—Hugo E. Weisberger

[57] ABSTRACT

The invention relates to acid crystals the surface of which consists at least partially of a dehydrated water soluble salt. The preparation thereof is characterized in that the acid crystals are mixed with a metal oxide or hydroxide and the obtained mixture is reacted under substantially anhydrous conditions in the presence of traces of water. These modified crystals are very suitable to use as the acidic component in various mixtures, e.g. in effervescent mixtures, as these crystals can absorb some moisture without starting the carbon dioxide development. Tablets containing the acid crystals of the invention are hard when freshly prepared and show the tendency to gain in hardness on exposure to the atmosphere for some days. Moreover they are completely water-soluble with a delayed acid release.

11 Claims, No Drawings

SURFACE-MODIFIED ACID CRYSTALS AND PROCESS FOR THEIR PREPARATION

This invention relates to novel modified acids and their preparation, as well as to tablets comprising these modified acids.

BACKGROUND OF THE INVENTION

In the preparation of tablets which are to disintegrate in water the problem often occurs that the tablets obtained are brittle and disintegrate during prolonged storage when exposed to the air. Further the problem may arise that the tablets are hard and disintegrate only after a prolonged period of time if at all.

With tablets which comprise both acidic and basic components the problem often occurs that acids and bases are incompatible since they will form a precipitate in aqueous solutions. This occurs, for example, on using citric acid and a water-soluble calcium salt. On application of said combination a water-insoluble calcium citrate will be formed. The formation of a precipitate is not only objectionable from an esthetic viewpoint, but it will also cause difficulties in the administration of measured amounts of anions and cations. Moreover, the formation of a precipitate will have an adverse effect on the effervescence of effervescent tablets. Moreover, with the known tablets containing an acid and a carbonate or bicarbonate the development of carbon dioxide starts soon after absorption of some moisture from the surrounding air, so that the tablets will disintegrate prematurely.

SUMMARY OF THE INVENTION

It has now been found that the above disadvantages can be overcome largely or completely by means of the novel modified acids. These modified acids are characterized in that they consist of crystals the surface of which is formed partially or completely by a dehydrated water-soluble salt. In the preparation of these modified acids attention has to be paid only that the cations as such should not form a water-insoluble salt with the acid directly. Acid and salt have the same anion. It is, however, also possible to use mixtures of each of the components. This will be discussed in more detail below.

The modified acids according to the invention can be prepared by mixing crystals of an acid with a metal oxide or hydroxide, hereinafter also indicated as the metal compounds, under substantially anhydrous conditions in the presence of a small amount of a substantially anhydrous organic solvent. The copresence of a trace of water, usually less than 1 percent based on the total weight of the mixture, is essential to initiate the reaction. The surface of the acid crystals is thus wetted. It is assumed that the surface of the acid is dissolved, at least partially, whereupon it reacts while dissolved with the metal compound, whereupon the formed salt, probably a basic salt, will precipitate on the surface of the crystals. After some time the crystal surfaces show shallow spots or cavities. It is therefore assumed that the reaction is not limited to the initial surface but penetrates into the crystal at least partially.

Another method to modify the acid crystals consists of mixing the acid crystals with dry crystals of the metal compound in a fluidized bed which is maintained by means of an inert gas which contains a small amount of substantially dry solvent for the acid.

Yet another method consists of spray-drying a solution or a dispersion of the metal compound onto the acid crystals under substantially anhydrous conditions.

It is also possible to mix the acid crystals and the metal compound and to bring the mixture into an atmosphere which is saturated with the vapor of a solvent for the acid.

Many possible variations of the above methods will be obvious to the expert in the field of topochemistry. An example of a variation of that type is the method in which a fluidized bed is made of acid crystals only by means of the inert carrier gas, such as for example air, the carrier gas containing ammonia together with traces of water.

The modified acid crystals preferably contain both crystalline salt and any residual acid crystal in anhydrous form though partially dehydrated modified acid crystals are also useful.

Suitable acids to be used as starting material in the process of the present invention are those acids which are crystalline under atmospheric conditions in combination with metal compounds of which the cation forms a water-soluble salt with the acid anion. This can be either a normal water-soluble salt, usually a basic salt, or a water-soluble complex salt. Suitable acids are organic acids and particularly polybasic organic acids, for example adipic acid, fumaric acid, malic acid, maleic acid, malonic acid, succinic acid, sebacic acid, acetosalicylic acid, citric acid, ascorbic acid, gluconic acid, sugar acids, ethylene diamine tetraacetic acid (hereinafter abbreviated to EDTA), cinnamic acid, cyclamic acid and γ- and δ-lactones which react under the prevailing reaction conditions as the corresponding γ- and δ-hydroxy carboxylic acids.

Suitable metal compounds are the oxides and hydroxides of alkali metal and alkaline earth metal as well as of magnesium, aluminum, tin, ferro, nickel, cobalt, silver and lead. The term "alkali metal" in this specification also comprises ammonia and strong basic amines. Some metals are preferably added as oxide, such as, for example, magnesium. Other metals are preferably added as hydroxides, such as, for example, tin, nickel, aluminum, the alkaline earth metals and the metals of the iron group of the periodic system.

Even though the final product preferably comprises only one anion, it may yet comprise two or more different anions simultaneously, provided that no precipitate will be formed on dissolution in water. Thus, for example, fumaric or citric acid and cyclamic acid can be crystallized simultaneously from a solution. Also cyclamic acid can be crystallized from a solution onto fumaric or citric acid crystals prior to the start of the topochemical reaction according to the invention.

The modified acid crystals according to the invention are easily soluble in water with a delayed acid release. They are very suitable to use as the acidic component in various mixtures e.g. in effervescent mixtures, as they can absorb some moisture without starting the carbon dioxide development. Incorporated in tablets the modified acid does not react or if at all, very slowly with any metal compound present. The tablets are readily soluble in water without forming a precipitate. No precipitate will occur within an hour from the moment the tablet has completely dissolved. The tablets are also hard when freshly prepared and show the tendency to gain in hardness on exposure to the atmosphere for at least two days. For storage of the tablets over a prolonged period of time of many months or years it is preferred to store them in an enclosed space, thus ensuring an equilibrium between the tablets and the surrounding atmosphere in said enclosed space.

If effervescent tablets are to be prepared it is a simple matter of incorporating a suitable agent capable of developing gas in an aqueous medium. Usually this agent is either a carbonate or a bicarbonate. From the above it will be evident that these additives in turn should, by preference, be partially or completely dehydrated.

In this respect it should be observed that the tablets according to the invention are harder and less brittle than corresponding tablets in which all components are fully hydrated. With respect to the effervescent tablets of the invention it is to be observed that these are superior to the commonly known effervescent tablets. The latter are brittle and show a distinct tendency to fall apart to a powder.

Solvents suitable to be used in the preparation of the modified acid crystals are for example chloroform, carbon tetrachloride, diethylether, diisopropylether, methylene chloride, isopropylalcohol, petroleumether, toluene and methanol. The solvents should be substantially anhydrous.

Suitable amounts of water required to induce the reaction can vary from 0.01 percent – 2 percent by weight of the total mixture of reactants but preferably the amount of water is between 0.1 percent and 0.5 percent by weight.

The following examples illustrate the invention.

DESCRIPTION OF THE PREFERRED EMBODIMENTS

EXAMPLE I 5.5 Kg of powdered anhydrous citric acid and 925 g. of calcium-hydroxide were mixed for 2 minutes in a vacuum mixer of stainless steel. To this mixture was added 2 l of dry methylene chloride, dried over $CaCl_2$. After addition the mixer was closed to prevent evaporation of the methylene chloride. The mixture was stirred for an additional 15 minutes whereafter 500 ml of dry methanol were added. Mixing was then continued for 2 minutes after which a vacuum was drawn in the mixer, causing evaporation of most of the methylene chloride. Subsequently the methanol and the remainder of the methylene chloride were removed by evaporation in vacuum at 50° C. The resulting powder was free flowing and readily soluble in water without any precipitation of tricalciumcitrate within 3 hours.

EXAMPLE II

The procedure of Example I was repeated using the following ingredients: 7.3 kg of anhydrous adipic acid (120 mesh) and 3.6 kg of calciumhydroxide. 2.8 l of methylene chloride were used. The resulting powder dissolves readily in water and does not give precipitation of calcium adipate within 3 hours.

EXAMPLE III

The following components were mixed after drying in a mixer (45 l) in the amounts indicated:

| | |
|---|---|
| citric acid | 8.19 kg |
| adipic acid | 0.18 kg |
| calciumhydroxide | 1.68 kg | until the granule size was between 0.05 and 0.1 mm. A small sample of this mixture shows an acidic reaction on a moist pH paper. To the above mixture were added 500 ml of dry methylene chloride with stirring, which was continued for 10 minutes.

At the same time a methanolic solution had been prepared in a round bottom vessel (2 l) provided with a reflux cooler, as follows: 150 g of citric acid and 80 g of cyclamic acid were dissolved in 150 ml methanol with mild boiling of the solvent. The boiling was continued for 2 minutes. Subsequent to the boiling 100 ml cold methanol were added. The methanolic solution thus obtained was mixed with the methylene chloride batch with stirring for 20 seconds, after which the solvents were evaporated. A dry powder of colored granules was obtained. The powder dissolves readily in water without forming any precipitate within 3 hours.

EXAMPLE IV

A mixture of 5.5 kg of citric acid, 600 g of ascorbic acid and 650 g of adipic acid (all powdered) was mixed for 2 minutes at low speed in a mixer as used in Example I. 2.8 kg of calcium-hydroxide were added to the mixture thus obtained and the stirring was continued for another 2 minutes, whereafter 4.2 l of chloroform were added. After standing for 25 minutes the solvent was removed by evaporation under vacuum. To the substantially dry product were then added 0.8 l of dry methanol and 1.9 kg of $Na_2CO_3.K_2CO_3$ with stirring for 2 minutes. Thereafter the solvent was evaporated at 45° C until a fully dry product was obtained. The resulting powder were pressed to tablets which dissolve readily in water with effervescence without any precipitate being formed within 5 hours.

EXAMPLE V

30 Kg of citric acid crystals were introduced in a container provided with an inlet and an outlet for the circulation of gas. The gas circuit is arranged in a manner that the gas can optionally be circulated in a closed circuit. A small amount of methanol (1 l) was introduced in the container. The gas circulation (air) was started in a closed circuit and substantially all methanol evaporated. Then 400 g of dry ammonia gas was introduced in the gas current whereafter the gas circulation was continued for 15 minutes. Subsequently 1 kg of sodium carbonate was added, which stopped further reaction. The gas current was interrupted and fresh dry air was blown through until the reaction mixture was fully dry. The resulting product was free flowing and passive to water vapor, but it dissolved rapidly in water.

Tablets made with the product thus obtained are not brittle maintaining these properties on storage for 3 months and dissolved readily in water with increasing effervescence, without forming a precipitate.

EXAMPLE VI

In a vacuum mixer of stainless steel 4 kg of powdered anhydrous citric acid and 420 g of magnesium oxide were mixed for 3 minutes. To this mixture was added 1.4 l of dry methylene chloride, whereafter the mixer was closed to prevent evaporation. After stirring the mixture for an additional 20 minutes 350 ml of dry methanol were added and the mixing continued for 3 minutes, after which the methylene chloride was evaporated in vacuum. Finally the methanol and the rest of the methylene chloride were removed by evaporation in vacuum at 50° C. The powder obtained was free flowing and readily and completely soluble in water without any precipitation of a magnesium salt.

What is claimed is:

1. Process for the preparation of acid crystals the surface of which is formed at least partially of a dehydrated water-soluble basic salt of the acid, comprising the steps of wetting a dry mixture of water-soluble organic acid crystals and a compound of a metal the cation of which forms a water-soluble salt with the anion of said acid, with a substantially anhydrous organic solvent for said acid, in the presence of an amount of water between about 0.01 percent and about 2 percent by weight of the total dry mixture, thereby forming said basic salt on the surface of said acid crystals, and thereafter drying said mixture.

2. The process of claim 1 in which said metal compound is selected from the group consisting of calcium oxide, calcium hydroxide, magnesium oxide, and magnesium hydroxide.

3. The process of claim 1 in which the acid is a polybasic organic acid.

4. The process of claim 1 in which the acid is citric acid.

5. The process of claim 1 in which the amount of water is between about 0.1 percent and about 0.5 percent by weight of the dry mixture.

6. The process of claim 1 in which the solvent is methylene chloride.

7. Organic acid crystals, the surface of which is formed at least partially of a dehydrated water-soluble basic metal salt of the acid, said crystals being readily soluble in water with a delayed acid release.

8. The composition of claim 7 which is in the form of a tablet.

9. The composition of claim 7 in which the acid is citric acid.

10. The composition of claim 7 in which the metal is selected from the group consisting of calcium and magnesium.

11. The composition of claim 7 in which the metal is calcium.

* * * * *

UNITED STATES PATENT OFFICE
CERTIFICATE OF CORRECTION

Patent No. 3,663,271        Dated May 16, 1972

Inventor(s) Gerhard Gergely

It is certified that error appears in the above-identified patent and that said Letters Patent are hereby corrected as shown below:

Change the name of the inventor to: Gerhard Gergely.

Signed and sealed this 26th day of September 1972.

(SEAL)
Attest:

EDWARD M. FLETCHER, JR.             ROBERT GOTTSCHALK
Attesting Officer                   Commissioner of Patents